United States Patent [19]
Aoki et al.

[11] Patent Number: 5,806,307
[45] Date of Patent: Sep. 15, 1998

[54] EXHAUST GAS-PURIFYING SYSTEM FOR INTERNAL COMBUSTION ENGINES

[75] Inventors: Takuya Aoki; Yuichi Shimasaki; Hiroaki Kato; Akihisa Saito; Takashi Komatsuda; Tetsu Teshirogi, all of Wako; Takayoshi Nakayama, Tochigi-ken; Hideo Furumoto, Wako, all of Japan

[73] Assignee: Honda Giken Kogyo Kabushiki Kaisha, Tokyo, Japan

[21] Appl. No.: 698,108

[22] Filed: Aug. 15, 1996

[30] Foreign Application Priority Data

Aug. 25, 1995 [JP] Japan .................................... 7-238962

[51] Int. Cl.$^6$ ........................................................ F01N 3/28
[52] U.S. Cl. .............................. 60/277; 60/284; 60/286; 60/300
[58] Field of Search ........................... 60/277, 284, 286, 60/300, 303; 219/202, 205

[56] References Cited

U.S. PATENT DOCUMENTS

| | | | |
|---|---|---|---|
| 5,257,501 | 11/1993 | Wataya | 60/284 |
| 5,321,231 | 6/1994 | Schmalzroedt et al. | 60/300 |
| 5,404,720 | 4/1995 | Laing | 60/300 |
| 5,512,789 | 4/1996 | Lyon | 60/300 |
| 5,539,286 | 7/1996 | Brinkmeyer et al. | 60/300 |
| 5,555,725 | 9/1996 | Shimasaki et al. | 60/284 |
| 5,609,024 | 3/1997 | Fujiwara et al. | 60/284 |
| 5,645,745 | 7/1997 | Hartwick et al. | 60/300 |
| 5,689,952 | 11/1997 | Kato et al. | 60/284 |

*Primary Examiner*—Willis R. Wolfe
*Attorney, Agent, or Firm*—Nikaido, Marmelstein, Murray & Oram LLP

[57] ABSTRACT

An exhaust gas-purifying system is provided for an internal combustion engine for use in a vehicle having an alternator driven by the engine to generate electric power. An electrically-heated catalyzer is arranged in the exhaust system of the engine and connected to the alternator to be electrically heated thereby. A changeover switch is provided for selectively switching the destination of electric power generated by the alternator to the electrically-heated catalyzer and to the electrical equipment. An ECU controls the electric power generated by the alternator, depending upon a direction in which the changeover switch has been switched. The ECU detects abnormality of the changeover switch, and when the abnormality is detected, the electric power generated by the alternator is changed to a value smaller than a value assumed when the changeover switch is normal.

5 Claims, 8 Drawing Sheets

5,806,307

EXHAUST GAS-PURIFYING SYSTEM FOR INTERNAL COMBUSTION ENGINES

BACKGROUND OF THE INVENTION

1. Field of the Invention

This invention relates to an exhaust gas purifying system for an internal combustion engine which has an electrically-heated catalyzer.

2. Prior Art

A catalyzer employed in an internal combustion engine, for purifying exhaust gases emitted from the engine does not become activated until a considerable time period elapses after the start of the engine when the engine is started in a cold state. To accelerate the activation of the catalyzer, there is conventionally employed an electrically-heated catalyzer which is electrically heated to become promptly activated. Further, to accurately control electric power supplied to the electrically-heated catalyzer, an exhaust gas-purifying system for internal combustion engines is known, for example, from U.S. Ser. No. 08/634,507, still pending. According to the known system, the electrically-heated catalyzer is supplied with electric power from an alternator of a vehicle in which the engine is installed, and an energization time period thereof is set according to a detected engine temperature or a like parameter. Then, the destination of electric power supplied from the alternator is switched from electrical equipment mounted on a chassis of the vehicle to the catalyzer by means of a changeover switch to energize the catalyzer over the set energization time period. On this occasion, voltage generated by the alternator is set to a higher value than a normal value, i.e. output voltage from a battery of the vehicle according to detected operating conditions of the engine so as to reduce current supplied to the electrically-heated catalyzer, to thereby minimize or reduce waste of energy and hence curtail costs involved in employing peripheral component parts of the electrically-heated catalyzer.

In the known system, however, if the changeover switch is locked in a position in which it is connected to the electrical equipment, or switched to the electrical equipment side due to an unexpected factor during the high voltage energization of the electrically-heated catalyzer, high-voltage current to be supplied to the electrically-heated catalyzer flows through the electrical equipment, to thereby damage the same.

SUMMARY OF THE INVENTION

It is the object of the invention to provide an exhaust gas-purifying system for internal combustion engines, which is capable of preventing electrical equipment from being damaged due to failure of the changeover switch or malfunctioning of the same upon the start of energization of the electrically-heated catalyzer and/or during energization of the same.

To attain the above object, the present invention provides an exhaust gas-purifying system for an internal combustion engine for use in a vehicle having electrical equipment mounted on a chassis thereof, and an alternator driven by the engine, for generating electric power, the engine having an exhaust system, comprising:

an electrically-heated catalyzer arranged in the exhaust system, the catalyzer being connected to the alternator to be electrically heated by the electric power generated by the alternator;

a changeover switch for selectively switching destination of the electric power generated by the alternator to the electrically-heated catalyzer and to the electrical equipment; and control means for controlling the electric power generated by the alternator, depending upon a direction in which the changeover switch has been switched;

the control means including abnormality-detecting means for detecting abnormality of the changeover switch, and output-changing means responsive to detection of the abnormality of the changeover switch by the abnormality-detecting means, for changing the electric power generated by the alternator to a value smaller than a value assumed when the changeover switch is normal.

Preferably, the output-changing means changes the electric power generated by the alternator to a value at which the electrical equipment will not be damaged, when the abnormality of the changeover switch is detected by the abnormality-detecting means.

Advantageously, the electrically-heated catalyzer has a heater resistance, the abnormality-detecting means including voltage-detecting means for detecting voltage across the heater resistance, and output state-detecting means for detecting an output state of the alternator.

Alternatively, the abnormality-detecting means includes electric current-detecting means for detecting electric current supplied to the electrically-heated catalyzer, and output state-detecting means for detecting an output state of the alternator.

Preferably, when the destination of the electric power generated by the alternator is switched to the electrically-heated catalyzer by the changeover switch, the control means controls the electric power generated by the alternator to a value larger than a value assumed when the destination of the electric power generated by the alternator is switched to the electrical equipment by the changeover switch, the output-changing means being responsive to the detection of the abnormality of the changeover switch by the abnormality-detecting means, for controlling the electric power generated by the alternator to the value assumed when the destination of the electric power generated by the alternator is switched to the electrical equipment by the changeover switch.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
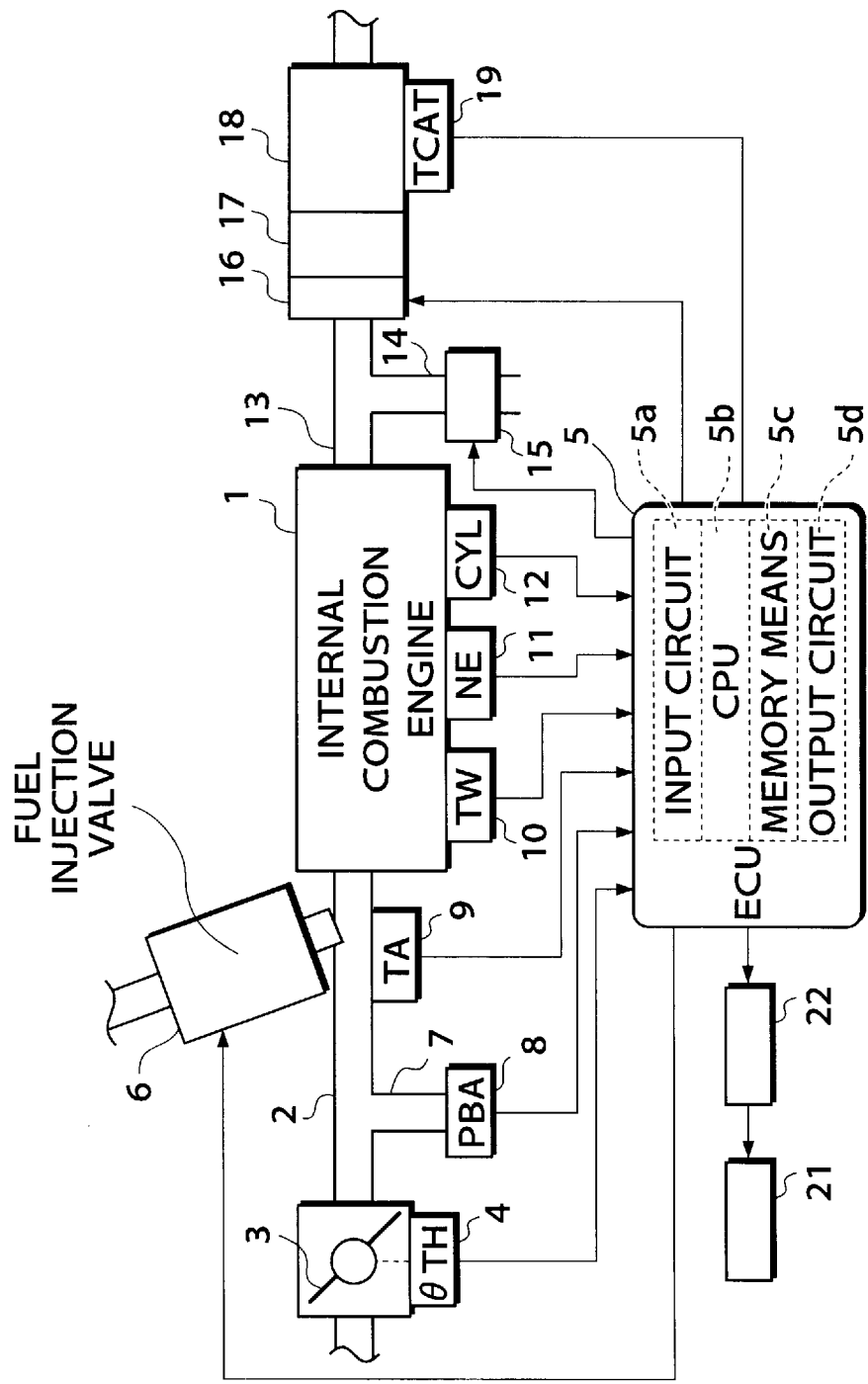
FIG. 1 is a block diagram schematically showing the whole arrangement of an internal combustion engine and an exhaust gas-purifying system therefor, according to a first embodiment of the invention.

Referring first to FIG. 1, there is illustrated the whole arrangement of an internal combustion engine and an exhaust gas-purifying system therefor, according to an embodiment of the invention. In the figure, reference numeral 1 designates an internal combustion engine (hereinafter referred to as "the engine"), which has an intake pipe 2 connected to the cylinder block of the engine 1, in which is arranged a throttle valve 3. A throttle valve opening (θTH) sensor 4 is connected to the throttle valve 3, for generating an electric signal indicative of the sensed throttle valve opening θTH to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is connected via a conduit 7 to the intake pipe 2 at a location immediately downstream of the throttle valve 3, for sensing absolute pressure PBA within the intake pipe 2, and is electrically connected to the ECU 5, for supplying an electric signal indicative of the sensed absolute pressure PBA to the ECU 5. Further, an intake air temperature (TA)-sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, which is filled with coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a signal pulse (hereinafter referred to as "a TDC signal pulse") at each of predetermined crank angles (e.g. whenever the crankshaft rotates through 180 degrees when the engine is of a 4-cylinder type) which each correspond to a predetermined crank angle before a top dead point (TDC) of each cylinder corresponding to the start of the suction stroke of the cylinder, while the CYL sensor 12 generates a signal pulse at a predetermined crank angle of a particular cylinder of the engine, both of the pulses being supplied to the ECU 5.

An electrically-heated catalyzer (hereinafter referred to as "the EHC") 16, a starting catalyzer 17, and a three-way catalyzer 18 are arranged in an exhaust pipe 13 connected to the engine 1 in this order from an upstream side thereof, for purifying noxious components in exhaust gases from the engine, such HC, CO, and NOx. The starting catalyzer 17 is a small-sized catalyzer provided mainly for purifying exhaust gases emitted from the engine immediately after starting thereof.

Extending from the exhaust pipe 13 is a passage 14 for supplying secondary air into the exhaust pipe 13 at a location upstream of the EHC 16, in which is arranged an air pump 15.

The EHC 16 and the air pump 15 are electrically connected to the ECU 5 to have their operations controlled by signals from the ECU 5. Further, a catalyst temperature sensor 19 is connected to the three-way catalyzer 18, for supplying an electric signal indicative of the sensed catalyzer temperature TCAT to the ECU 5.

Further, an alternator 21, which is driven by the engine 1, is electrically connected to the ECU 5 via a regulator 22 such that voltage generated by the alternator 21 is controlled by a signal from the ECU 5.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom, etc., and an output circuit 5d which delivers control signals to the fuel injection valves 6, air pump 15, EHC 16, regulator 22, etc., for driving the same.

The CPU 5b calculates an energization time period TON of the ECH 16 and voltage VEHC supplied thereto in response to the output signals from the TW and TA sensors, to generate control signals based on results of the calculations.

Figure 2:
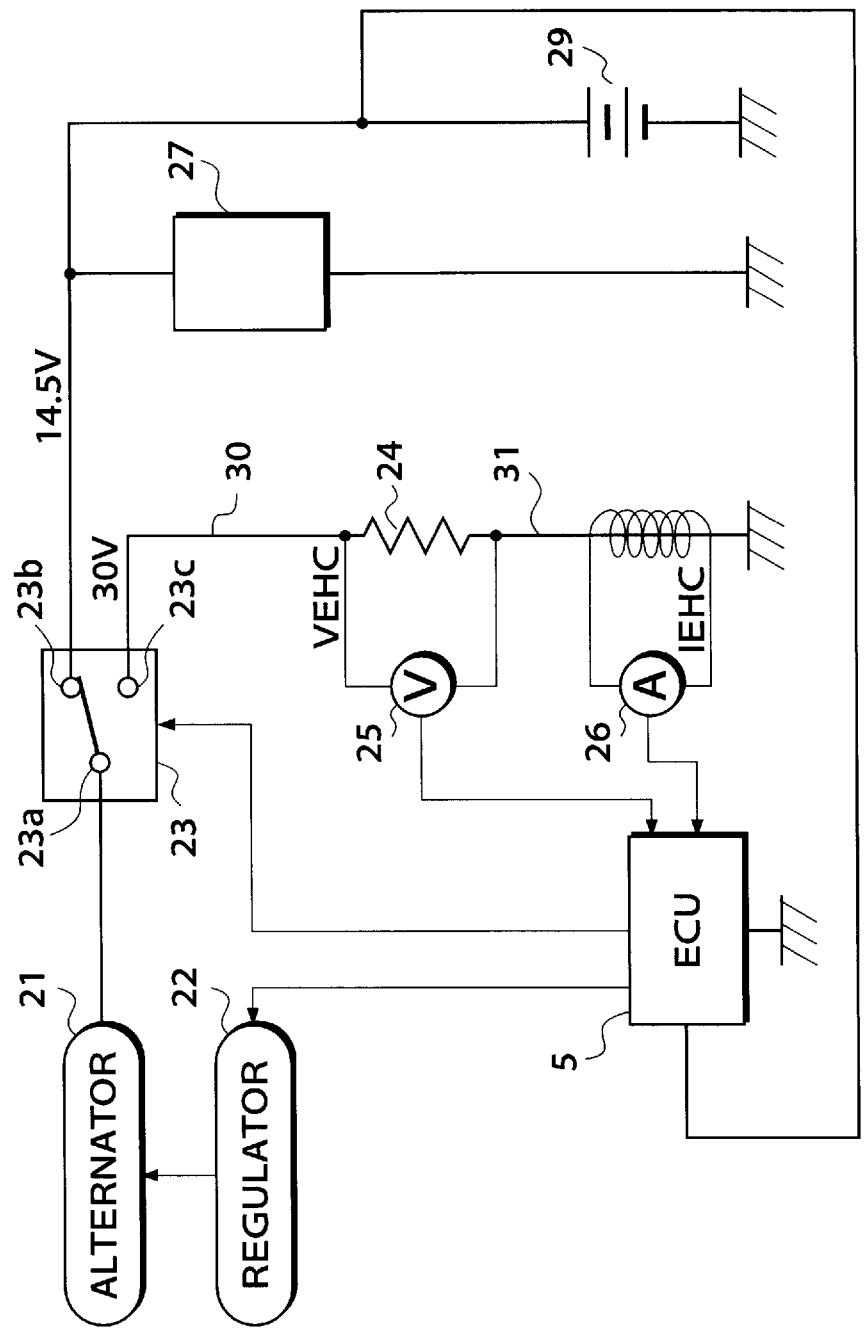
FIG. 2 is a circuit diagram showing the connection of a heater resistance of an electrically-heated catalyzer appearing in FIG. 1 and its related or peripheral circuit parts.

FIG. 2 shows a circuit formed by the ECU 5, the alternator 21, the regulator 22, a heater resistance 24 of the EHC 16, electrical equipment 27, and a battery 29. The ECH 16 employed in the present embodiment also acts as a heater, that is, it has a catalyst body thereof supplied with current to be heated thereby. The electrical resistance of the catalyst body is represented as the heater resistance 24.

The alternator 21 has an output thereof connected to a terminal 23a of a changeover switch 23 which has another terminal 23c connected to one end of the heater resistance 24 through a connecting line 30. The other end of the heater resistance 24 is grounded through a connecting line 31.

The changeover switch 23 has a further terminal 23b connected to a positive electrode of the battery 29 as well as to the electrical equipment 27. The electrical equipment 27 are grounded. The battery 29 has its negative electrode grounded and its positive electrode connected to the ECU 5.

The switch 23 is electrically connected to the ECU 5 to have its switching operation controlled by a signal from the ECU 5. The switch 23 is normally in a position shown in FIG. 2 in which the terminals 23a and 23b of the switch 23 are connected to each other, and controlled to be changed in position from its illustrated position immediately after the start of the engine 1, if required. Further, a voltage sensor 25 as abnormality-detecting means is connected to both ends of the heater resistance 24, to detect voltage VEHC across the heater resistance 24. The voltage sensor 25 is electrically connected to the ECU 5, for supplying a signal indicative of the sensed voltage VEHC across the heater resistance 24. Further, an electric current sensor 26 as abnormality-detecting means is provided on the connecting line 31 grounding the heater resistance 24, to detect heater current supplied to the heater resistance 24. The electric current sensor 26 is electrically connected to the ECU 5, for supplying a signal indicative of the sensed electric current to the ECU 5.

Figure 3:
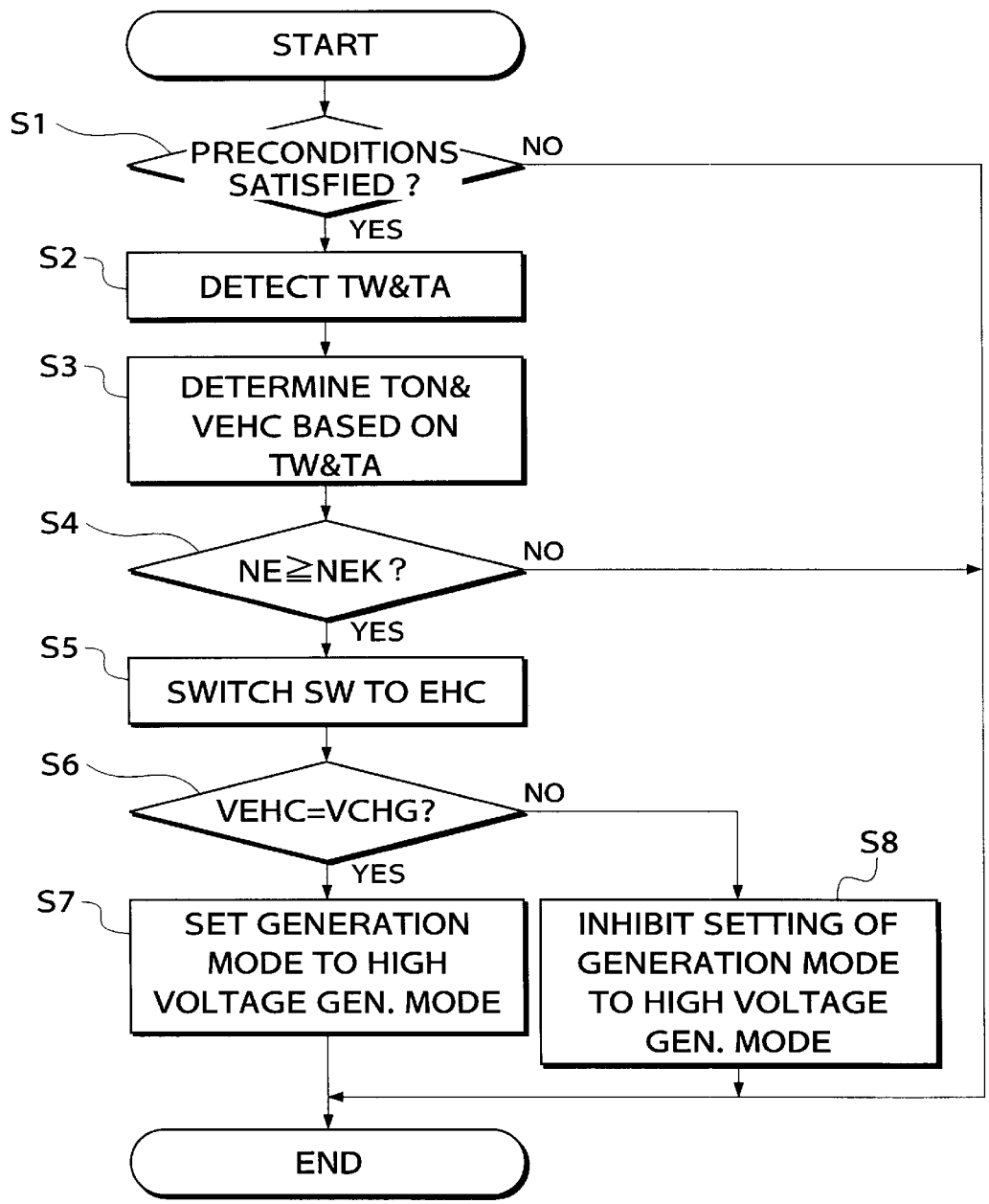
FIG. 3 is a flowchart showing a manner of controlling voltage supplied to the electrically-heated catalyzer and an energization time period of the same, including detection of abnormality of a changeover switch and a failsafe operation therefor at the start of energization of the catalyzer, according to the first embodiment.

FIG. 3 shows a program for controlling voltage supplied to the heater resistance 24 and the energization time period thereof as well as performing detection of abnormality of the changeover switch 23 and a failsafe operation therefor at the start of energization of the electrically-heated catalyzer 16. This program is executed at predetermined time intervals.

First, at a step S1, it is determined whether or not preconditions for carrying out the control of the electric power supply are satisfied, e.g. whether or not an ignition switch of the engine has been turned on. If the preconditions are not satisfied, the present routine is immediately terminated, whereas if the preconditions are satisfied, i.e. if the ignition switch has been turned on, detected values of the engine coolant temperature TW and the intake air temperature TA are read in at a step S2. The preconditions determined at the step S1 may be satisfied when the ignition switch is turned on and at the same time the engine coolant temperature TW and/or the catalyzer temperature TCAT is below a predetermined value.

Then, at a step S3, a TON map and a VEHC map which are set according to the TW and TA values are retrieved, to determine the energization time period (EHC-ON time period) TON of the heater resistance 24 and the voltage VEHC to be supplied to the EHC 16.

Figure 4A:
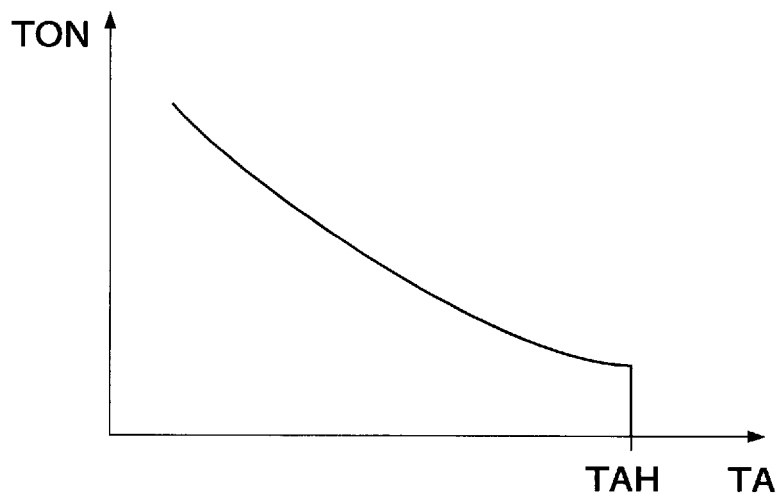
FIG. 4A is a graph showing the relationship between the energization time period TON of the catalyzer and intake air temperature TA.
Figure 4B:
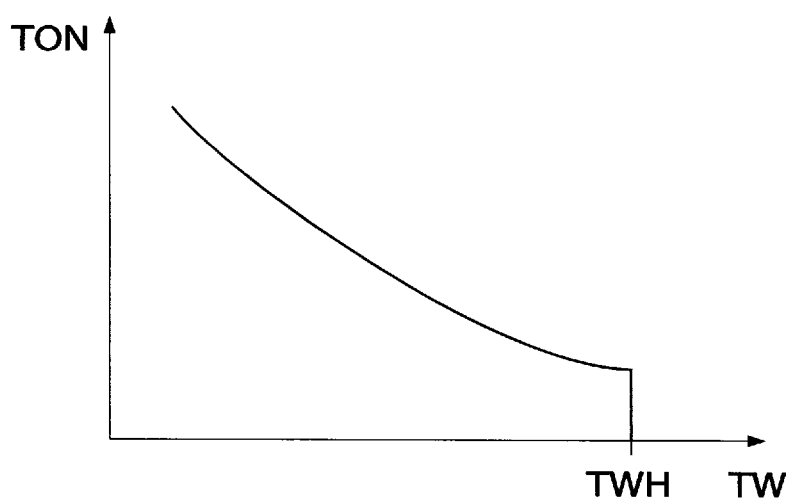
FIG. 4B is a graph showing the relationship between the TON value and engine coolant temperature TW.
Figure 5A:
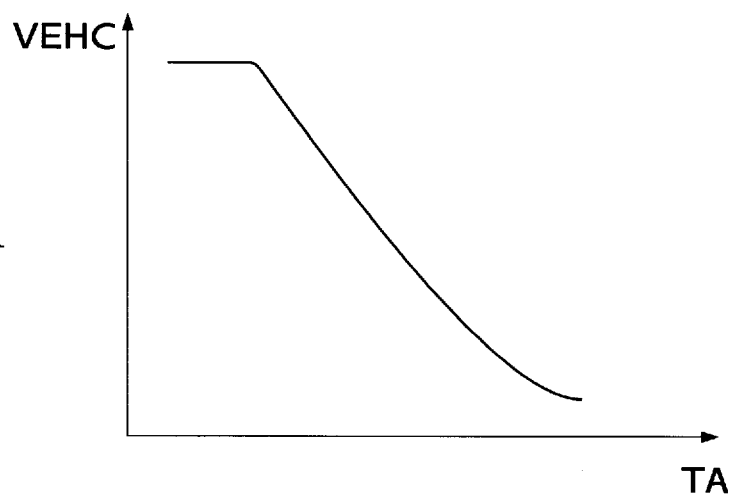
FIG. 5A is a graph showing the relationship between voltage VEHC supplied to the catalyzer and the intake air temperature TA.
Figure 5B:
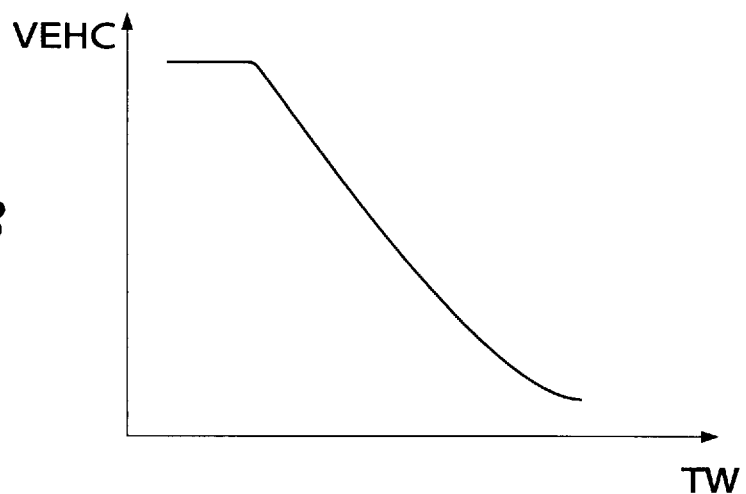
FIG. 5B is a graph showing the relationship between the VEHC value and the engine coolant temperature TW.
Figure 5C:
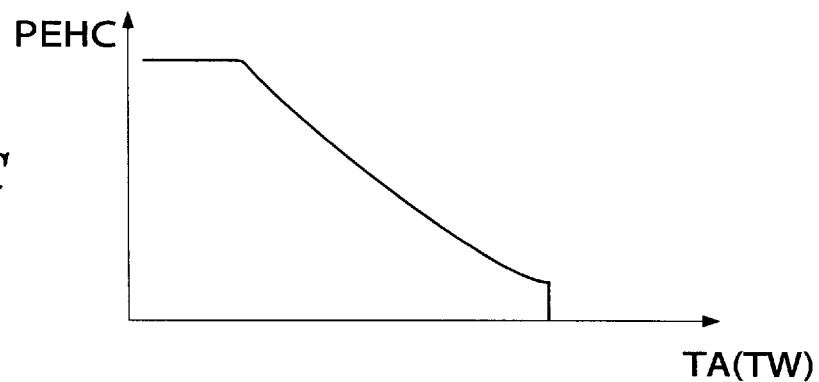
FIG. 5C is a graph showing the relationship between an amount of electric power PEHC supplied to the catalyzer and the intake air temperature TA or the engine coolant temperature TW.

The TON map is set based on the relationships shown in FIGS. 4A and 4B. More specifically, the TON value is decreased as the intake air temperature TA is higher, as shown in FIG. 4A, and as the engine coolant temperature TW is higher, as shown in FIG. 4B. When the intake air temperature TA and the engine coolant temperature TW exceed respective predetermined values TAH and TWH, energization of the heater resistance 24 is not carried out, that is, the TON value is set to 0. The TON map contains map values empirically determined by the use of an equation of $TON=f_1(TA)(TW)$ based on the relationships shown in FIGS. 4A and 4B. The VEHC map is set based on the relationships shown in FIGS. 5A and 5B. More specifically, the VEHC value is decreased as the intake air temperature TA is higher, as shown in FIG. 5A, and the engine coolant temperature TA is higher, as shown in FIG. 5B. The VEHC map contains map values empirically determined by the use of an equation of $VEHC=f_2(TA)(TW)$ based on the relationships shown in FIGS. 5A and 5B. By thus controlling the VEHC value, electric power PEHC supplied to the EHC 16 is controlled as shown in FIG. 5C. Advantageously, the VEHC value is set to a value considerably higher than output voltage from the battery 29, e.g. to 30 volts when the engine is started in a cold state. By virtue of this setting, current supplied to the resistance 24 can be reduced to approximately a half of that supplied to the same from the battery 29.

At the following step S4, it is determined whether or not the engine rotational speed NE exceeds a predetermined value NEK (e.g. 400 rpm) for determining whether or not complete explosion has taken place in the engine. It is determined that the EHC 16 can be operated if NE≧NEK holds. If NE<NEK holds, the present routine is immediately terminated. On the other hand, if NE≧NEK holds, the changeover switch 23 is switched to the terminal 23c side (EHC side) at a step S5. Then, at a step S6, the ECU 5 determines whether or not the EHC voltage VEHC detected by the voltage sensor 25 is equal to ordinary output voltage VCHG (e.g. 14.5 V). If the answer is affirmative (YES), it is determined that the switch 23 has been surely switched to the terminal 23c (EHC side), and then the generation mode of the alternator 21 is set to a high voltage generation mode (e.g. 30 V) in which output voltage VALT from the alternator 21 is controlled to a value equal to the VEHC value determined at the step S3, to thereby supply electric power to the EHC 16 at a step S7, followed by terminating the present program.

Thereafter, when the energization time period TON has elapsed, the alternator output voltage VALT is lowered to the ordinary output voltage VCHG and the changeover switch is switched to the terminal 23b side.

On the other hand, if it is determined at the step S6 that the EHC voltage VEHC is not equal to the ordinary output voltage VCHG, i.e. if VEHC<VCHG holds, which means that the switch 23 has not been surely switched to the terminal 23c side, e.g. due to locking of the switch 23 to the terminal 23b side, then the generation mode of the alternator 21 is inhibited from being set to the high voltage generation mode (30 V) at a step S8.

Thus, according to the present embodiment, high voltage can be prevented from being supplied to the electrical equipment 27, and as a result, even if failure of the changeover switch or malfunctioning of the same occurs upon the start of the EHC operating mode, the electrical equipment 27 can be prevented from being damaged.

Figure 6:
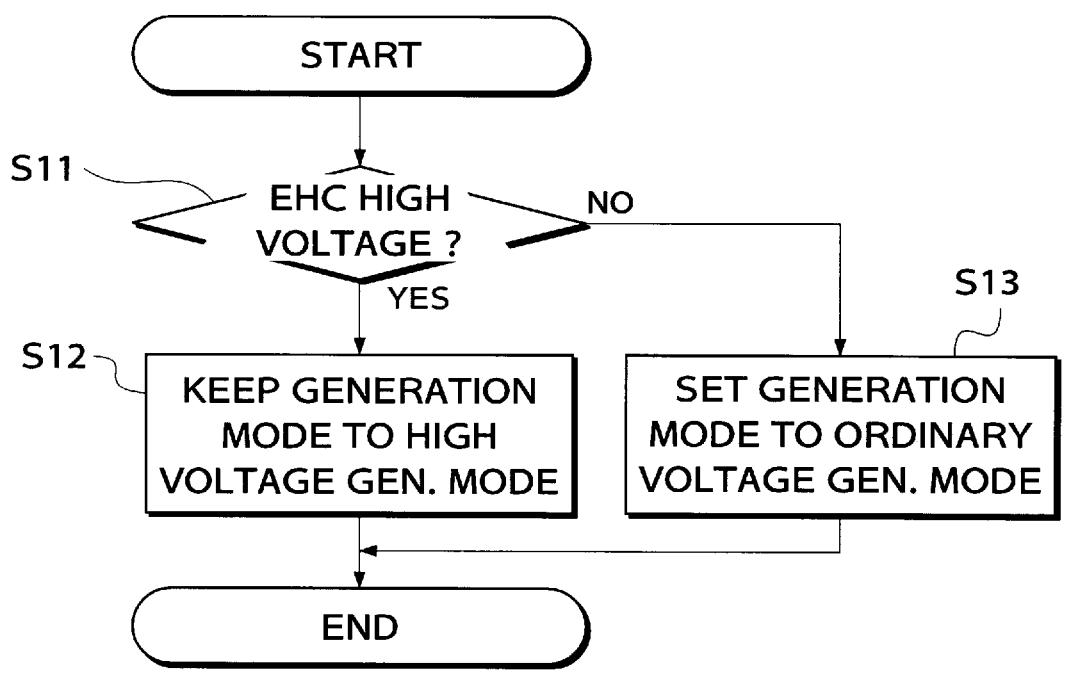
FIG. 6 is a flowchart showing a manner of detecting abnormality of the changeover switch and performing a failsafe operation therefor during energization of the electrically-heated catalyzer.

FIG. 6 shows a program for detecting changeover of the changeover switch 21 to the electrical equipment side due to failure or malfunctioning thereof and performing a failsafe operation during the EHC operating mode. This program is executed at predetermined time intervals during the EHC operating mode.

At a step S11, the ECU 5 determines whether or not the EHC voltage VEHC detected by the voltage sensor 25 is equal to the high voltage. If the answer is affirmative (YES), it is determined that the switch 23 is surely connected to the terminal 23c (EHC side), and then the generation mode of the alternator 21 is kept set to the high voltage generation mode at a step S12, followed by terminating the present routine.

If it is determined at the step S11 that the EHC voltage is not equal to the high voltage, which means that the switch 23 is not surely connected to the terminal 23c (EHC side), e.g. there is a possibility that the switch 23 is connected to the terminal 23b (electrical equipment side). Therefore, the generation mode of the alternator 21 is switched to the ordinary voltage generation mode at a step S13. Thus, high voltage can be prevented from being supplied to the electrical equipment 27, and as a result, even if failure of the changeover switch or malfunctioning of the same occurs during the EHC operating mode, the electrical equipment 27 can be prevented from being damaged.

Incidentally, in the present embodiment, a motor, not shown, of the air pump 15 is operated in synchronism with operation of the EHC 16.

Although in the above described embodiment, the voltage supplied to the EHC 16 and the energization time period of the same are both determined according to the engine coolant temperature TW and the intake air temperature TA, this is not limitative. Alternatively, the energization time period may be set to a fixed value. Further, in place of either the engine coolant temperature TW or the intake air temperature TA, the catalyzer temperature TCAT detected by the catalyst temperature sensor 19 may be employed for determination of the voltage VECH and the energization time period TON. Still further, the voltage VECH and the energization time period TON may be determined according to one or two of the engine coolant temperature TW, the intake air temperature TA, and the catalyzer temperature TCAT. Moreover, in place of the catalyzer temperature TCAT, a parameter representative of the temperature of the exhaust system such as the temperature of exhaust gases may be employed.

Next, description will be made of an exhaust gas-purifying system according to a second embodiment of the invention with reference to FIGS. 7 and 8.

Figure 7:
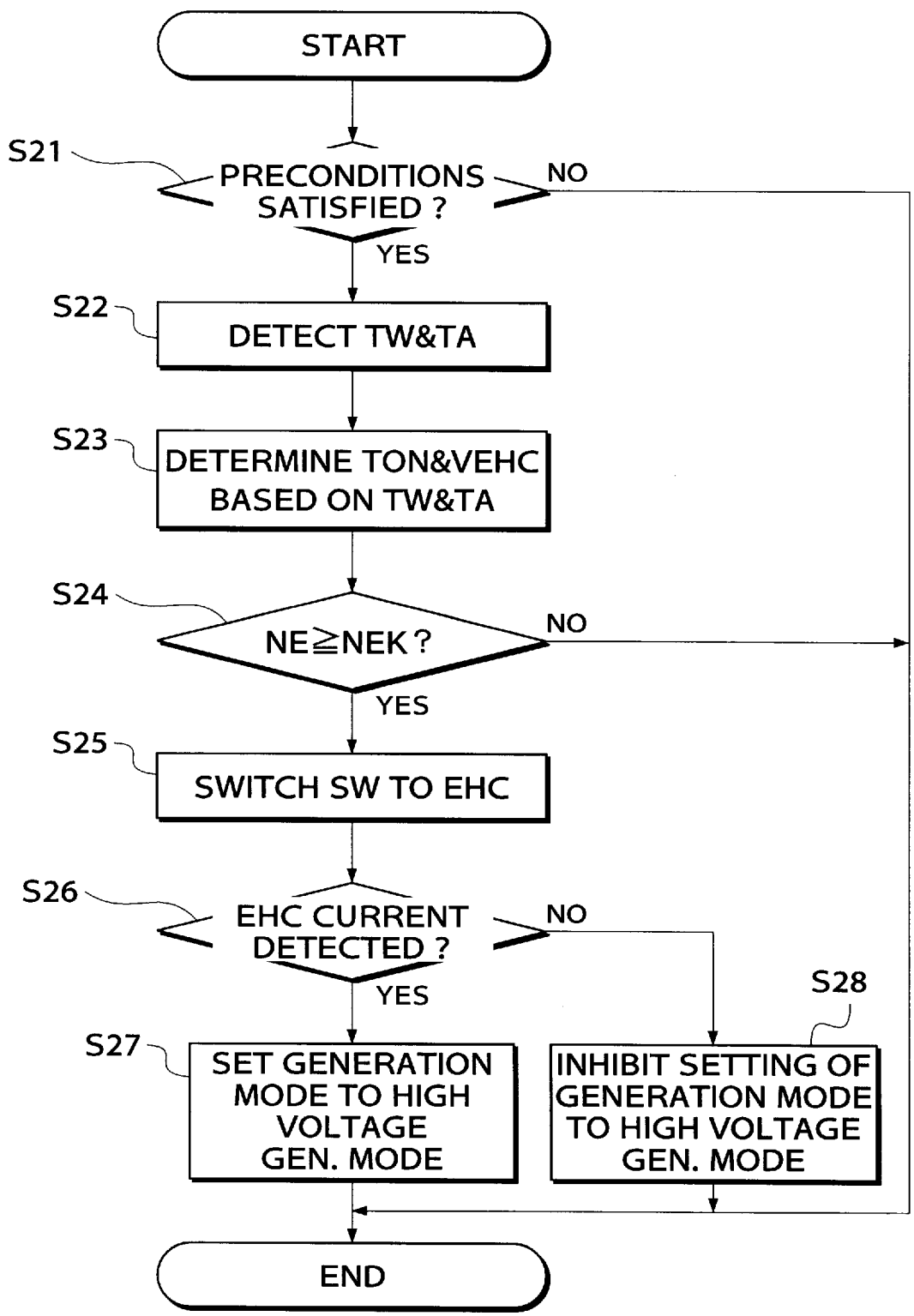
FIG. 7 is a flowchart similar to FIG. 3, according to a second embodiment of the invention.

FIG. 7 shows a program for controlling voltage supplied to the heater resistance 24 and the energization time period thereof as well as performing detection of abnormality of the changeover switch 23 and a failsafe operation therefor at the start of energization of the electrically-heated catalyzer 16, according to the second embodiment. In the figures, steps corresponding to those in FIG. 3 are designated by identical numerals, and description thereof is omitted.

While in the first embodiment described above, failure or malfunctioning of the changeover switch 23 is determined based on the detected EHC voltage VEHC, in the second embodiment failure or malfunctioning of the switch 23 is determined by detecting current IEHC supplied to the EHC 16. Specifically, at a step S26 in FIG. 7, it is determined whether or not any EHC current IEHC has been detected by the EHC current sensor 26. If the answer is affirmative (YES), the program proceeds to the step S7, whereas if the answer if negative (NO), the program proceeds to the step S8.

Figure 8:
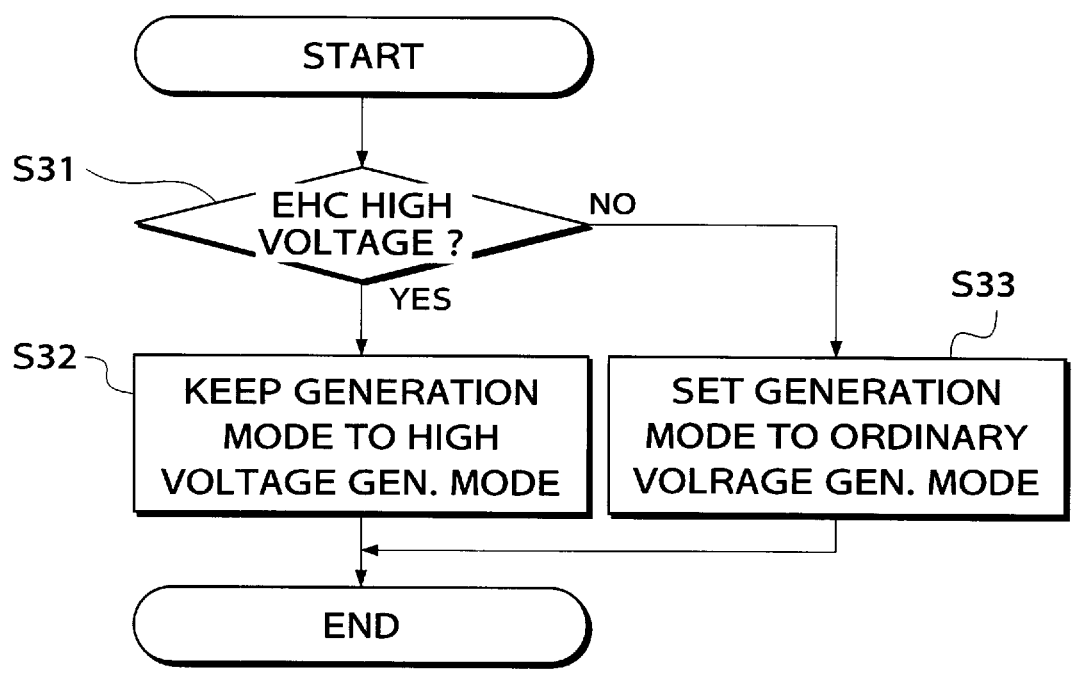
FIG. 8 is a flowchart similar to FIG. 6, according to the second embodiment.

FIG. 8 shows a program for detecting changeover of the changeover switch 21 to the electrical equipment side due to failure or malfunctioning thereof and performing a failsafe operation during the EHC operating mode, according to the second embodiment.

The program of FIG. 8 is distinguished from that of FIG. 6 only in a step S31, wherein failure or malfunctioning of the switch 23 during the EHC operating mode is determined based on whether any EHC current IEHC has been detected. Specifically, at the step S31, it is determined whether or not any EHC current has been detected by the EHC current sensor 26. If the answer is affirmative (YES), the program proceeds to the step S12, whereas if the answer if negative (NO), the program proceeds to the step S13.

What is claimed is:

1. An exhaust gas-purifying system for an internal combustion engine for use in a vehicle having electrical equipment mounted on a chassis thereof, and an alternator driven by said engine, for generating electric power, said engine having an exhaust system, comprising:

an electrically-heated catalyzer arranged in said exhaust system, said catalyzer being connected to said alternator to be electrically heated by said electric power generated by said alternator;

a changeover switch for selectively switching destination of said electric power generated by said alternator to said electrically-heated catalyzer and to said electrical equipment; and control means for controlling said electric power generated by said alternator, depending upon a direction in which said changeover switch has been switched;

said control means including abnormality-detecting means for detecting abnormality of said changeover switch, and output-changing means responsive to detection of said abnormality of said changeover switch by said abnormality-detecting means, for changing said electric power generated by said alternator to a value smaller than a value assumed when said changeover switch is normal.

2. An exhaust gas-purifying system as claimed in claim 1, wherein said output-changing means changes said electric power generated by said alternator to a value at which said electrical equipment will not be damaged, when said abnormality of said changeover switch is detected by said abnormality-detecting means.

3. An exhaust gas-purifying system as claimed in claim 1 or 2, wherein said electrically-heated catalyzer has a heater resistance, said abnormality-detecting means including voltage-detecting means for detecting voltage across said heater resistance, and output state-detecting means for detecting an output state of said alternator.

4. An exhaust gas-purifying system as claimed in claim 1 or 2, wherein said abnormality-detecting means includes electric current-detecting means for detecting electric current supplied to said electrically-heated catalyzer, and output state-detecting means for detecting an output state of said alternator.

5. An exhaust gas-purifying system as claimed in claim 1 or 2, wherein when said destination of said electric power generated by said alternator is switched to said electrically-heated catalyzer by said changeover switch, said control means controls said electric power generated by said alternator to a value larger than a value assumed when said destination of said electric power generated by said alternator is switched to said electrical equipment by said changeover switch, said output-changing means being responsive to said detection of said abnormality of said changeover switch by said abnormality-detecting means, for controlling said electric power generated by said alternator to said value assumed when said destination of said electric power generated by said alternator is switched to said electrical equipment by said changeover switch.

\* \* \* \* \*